(12) United States Patent
Lee et al.

(10) Patent No.: US 7,955,545 B2
(45) Date of Patent: Jun. 7, 2011

(54) NANO-IMPRINTING PROCESS

(75) Inventors: Yung-Chun Lee, Tainan (TW); Fei-Bin Hsiao, Tainan (TW); Cheng-Yu Chiu, Zhongli (TW)

(73) Assignee: National Cheng Kung University, Tainan (TW)

( * ) Notice: Subject to any disclaimer, the term of this patent is extended or adjusted under 35 U.S.C. 154(b) by 563 days.

(21) Appl. No.: 11/897,859

(22) Filed: Aug. 31, 2007

(65) Prior Publication Data

US 2008/0296803 A1 Dec. 4, 2008

(30) Foreign Application Priority Data

Jun. 1, 2007 (TW) .............................. 96119831 A (51) Int. Cl.
*B29C 59/00* (2006.01)
(52) U.S. Cl. ....................................... 264/293; 977/887
(58) Field of Classification Search .................. 264/293, 264/319; 977/887; 101/26, 27, 28, 32
See application file for complete search history.

(56) References Cited

U.S. PATENT DOCUMENTS

| | | | |
|---|---|---|---|
| 4,211,834 A * | 7/1980 | Lapadula et al. | 430/326 |
| 4,680,085 A * | 7/1987 | Vijan et al. | 438/482 |
| 4,791,046 A * | 12/1988 | Ogura | 430/296 |
| 5,278,008 A * | 1/1994 | Moss et al. | 430/1 |
| 2003/0175427 A1* | 9/2003 | Loo et al. | 427/256 |
| 2005/0173717 A1 | 8/2005 | Lee et al. | |
| 2006/0258163 A1 | 11/2006 | Ohashi et al. | |

OTHER PUBLICATIONS

Suh, D., J. Rhee, H.H. Lee, Bilayer reversal imprint lithography: direct metal-polymer transfer, Nanotechnology, vol. 15 (2004), pp. 1103-1107.*
Chien, C.H., H.M. Yu, The novel fabrication of multi-metal layers embedded in PMMA polymer materials, J. of Materials Processing Technology, Vo. 187-188 (2007), pp. 314-317. Available online Feb. 12, 2007.*
J. Rhee and H.H. Lee, Patterning organic light-emitting diodes by cathode transfer, Applied Physics Letters, vol. 81, No. 22 (2002), pp. 4165-4167.*
N. Kehagias, et al., Submicron three-dimensional structures fabricated by reverse contact UV nanoimprint lithography, J. Vac. Sci. Technol. B, vol. 24, No. 6 (2006), pp. 3002-3005.*

(Continued)

*Primary Examiner* — Christina Johnson
*Assistant Examiner* — Galen Hauth
(74) *Attorney, Agent, or Firm* — Muncy, Geissler, Olds, & Lowe, PLLC (57) ABSTRACT

A nano-imprinting process is described, comprising: providing a substrate including an imprinting material layer covering a surface of the substrate; providing a mold including protruding features set on a surface of the mold covered with an anti-adhesion layer; forming a transferring material layer on a top surface of each protruding feature; embedding the transferring material layer into a first portion of the imprinting material layer; removing the mold and separating the mold and the transferring material layer simultaneously to transfer the transferring material layer into the first portion of the imprinting material layer and to expose a second portion of the imprinting material layer; using the transferring material layer as a mask to remove the second portion of the imprinting material layer and a portion of the substrate; and removing the first portion of the imprinting material layer and the transferring material layer.

18 Claims, 6 Drawing Sheets

OTHER PUBLICATIONS

J. Zaumseil, et al., Three-Dimensional and Multilayer Nanostructures Formed by Nanotransfer Printing, Nano Letters, vol. 3, No. 9 (2003), pp. 1223-1227.*

D. Suh, S.-J. Choi, H.H. Lee, Rigiflex Lithography for Nanostructure Transfer, Advanced Materials, vol. 17 (2005), pp. 1554-1560.*

Nakamatsu et al., "Nanoimprint and Nanocontact Technologies Using Hydrogen Silsesquioxane", Apr. 2005, J. Vac. Sci. Technol. B 23(2), p. 507-512.*

Xia, et al., "Soft Lithography", Annu. Rev. Mater. Sci. 1998.28: 153-84.

Wolfe, et al., "Fabrication of Planar Optical Waveguides by Electrical Microcontact Printing", Appl. Phys. Lett., vol. 84, No. 10, Mar. 8, 2004, 1623-1625.

Xia, et al., "Microcontact Printing of Octadecylsiloxane on the Surface of Silicon Dioxide and its Application in Microfabrication", J. Am. Chem. Soc. 1995, 117, 9576-9577.

Suh, Dongchul et al, "Bilayer reversal imprint lithography: direct metal-polymer transfer", Nanotechnology, Jun. 30, 2004, pp. 1103-1107, vol. 15, Institute of Physics Publishing, UK.

* cited by examiner

NANO-IMPRINTING PROCESS

RELATED APPLICATIONS

This application claims priority to Taiwan Application Serial Number 96119831, filed Jun. 1, 2007, which is herein incorporated by reference.

FIELD OF THE INVENTION

The present invention relates to a macro/nano-imprinting process, and more particularly, to a mask-embedded imprinting process.

BACKGROUND OF THE INVENTION

In typical imprinting techniques, such as a hot embossed or laser assisted nano-imprinting, an external high energy heating source is needed to heat imprinting material layers to melt the imprinting material layers. However, during the high temperature heating treatment of the imprinting material layer, a substrate is in a high temperature circumstance, so that circuit layout structures pre-formed in the substrate are damaged, and an ill effect of stress remaining on the surface of the substrate is caused by a large temperature difference.

In addition, an imprinting material adopted in an ultraviolet (UV) curing nano-imprinting technique is in a liquid state at room temperature. In the transferring of a pattern of a mold, the mold is pressed into the imprinting material, and then the imprinting material is cured by ultraviolet to transfer the pattern structure of the mold into the imprinting material. The mold adopted in the ultraviolet curing nano-imprinting technique has to be made of a material that is pervious to ultraviolet, such as a quartz mold, or a PDMS mold formed by a mold-making technique. However, the manufacturing processes of the quartz mold and the PDMS mold both are very complicated, and the quartz mold and the PDMS mold are difficult to be manufactured, so that the molds are expensive.

In a soft lithography nano-imprinting technique, special ink is adopted as a material for pattern definition. However, the special ink is very expensive, and the ink spreads when a feature pattern is defined to an imprinting material layer to cause a defect of the inaccurate definition of the feature pattern.

Figure 1A:
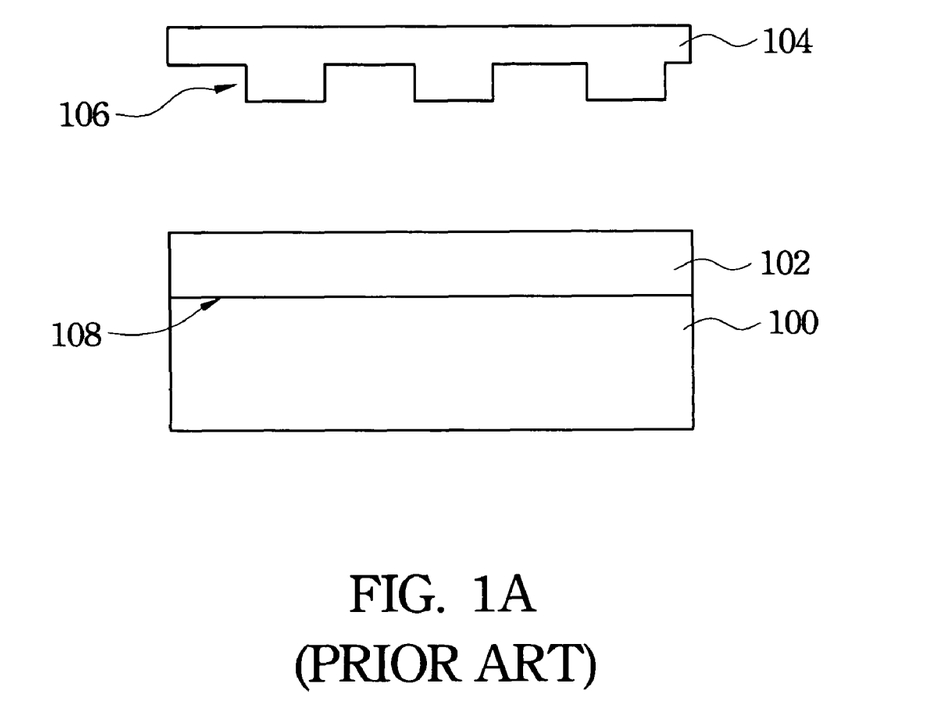
FIGS. 1A through 1F are schematic flow diagrams showing a conventional imprinting process.

FIGS. 1A through 1F are schematic flow diagrams showing a conventional imprinting process. In a typical imprinting process, a substrate 100 is firstly provided, and an imprinting material layer 102 is coated on a surface 108 of the substrate 100, wherein the imprinting material layer 102 has to be made of a thermoplastic polymer material. Simultaneously, a mold 104 is provided, wherein a surface of the mold 104 is set with a pattern structure 106. As shown in FIG. 1A, in the step of providing the mold 104, the surface of the mold 104 with the pattern structure 106 is opposite to the surface 108 of the substrate 100 coating with the imprinting material layer 102.

Figure 1B:
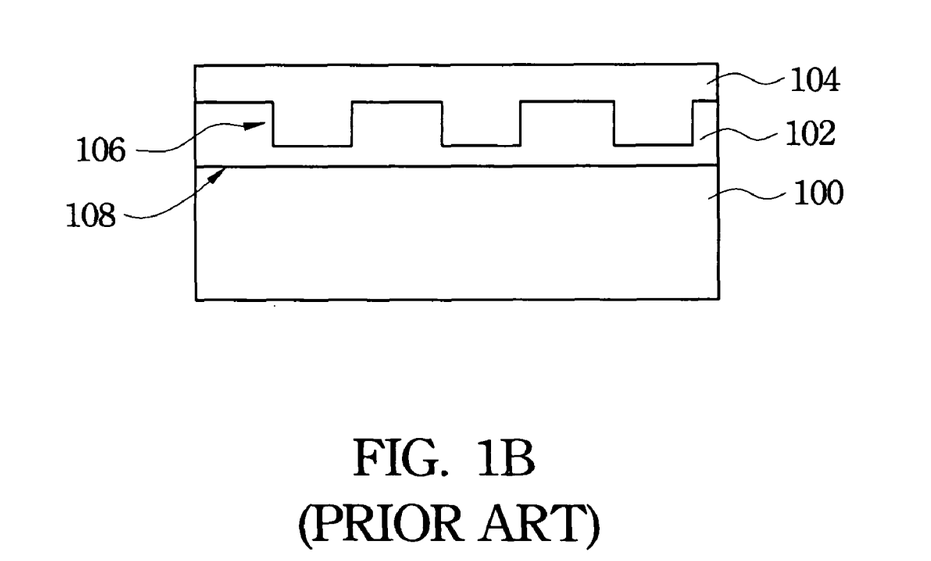
Figure 1C:
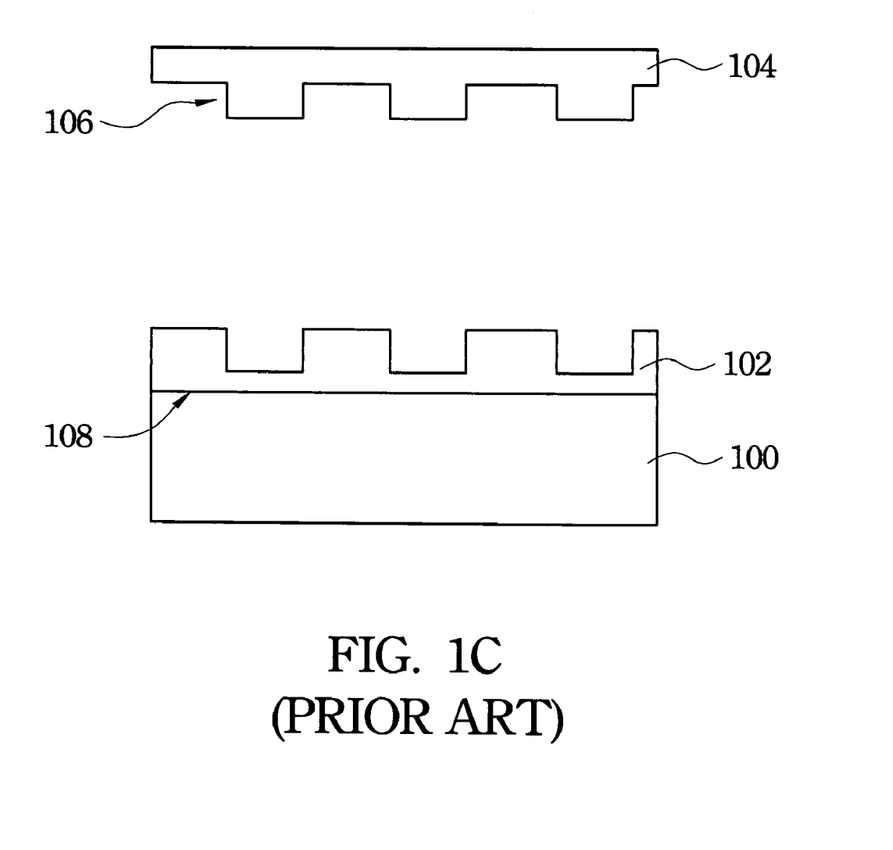

Then, a heating step is performed to melt the imprinting material layer 102. The mold 104 is pressed into the melted imprinting material layer 102 to transfer the pattern structure 106 of the mold 104 into the imprinting material layer 102, such as shown in FIG. 1B. Subsequently, a heating source is removed. After the temperature is reduced to the value below the glass transition temperature of the imprinting material layer 102, a mold-releasing step is performed to separate the mold 104 and the imprinting material layer 102, so as to transfer the pattern of the pattern structure 106 of the mold 104 onto the imprinting material layer 102, such as shown in FIG. 1C.

Figure 1D:
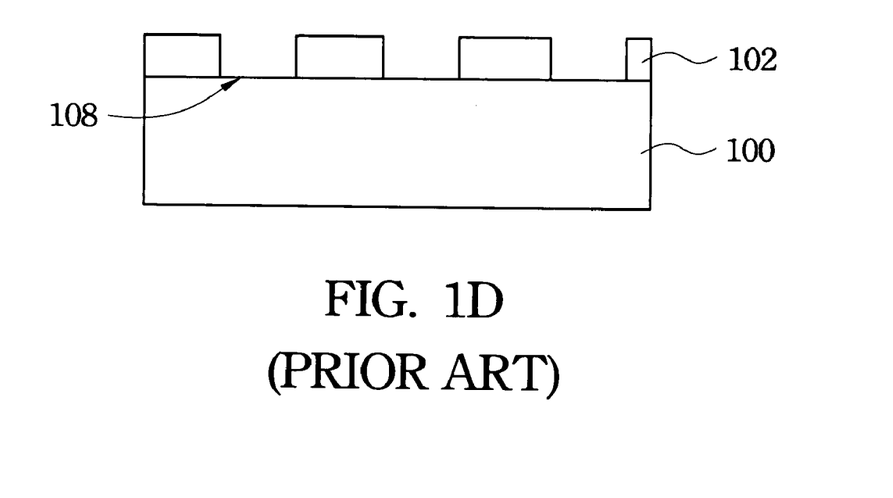
Figure 1E:
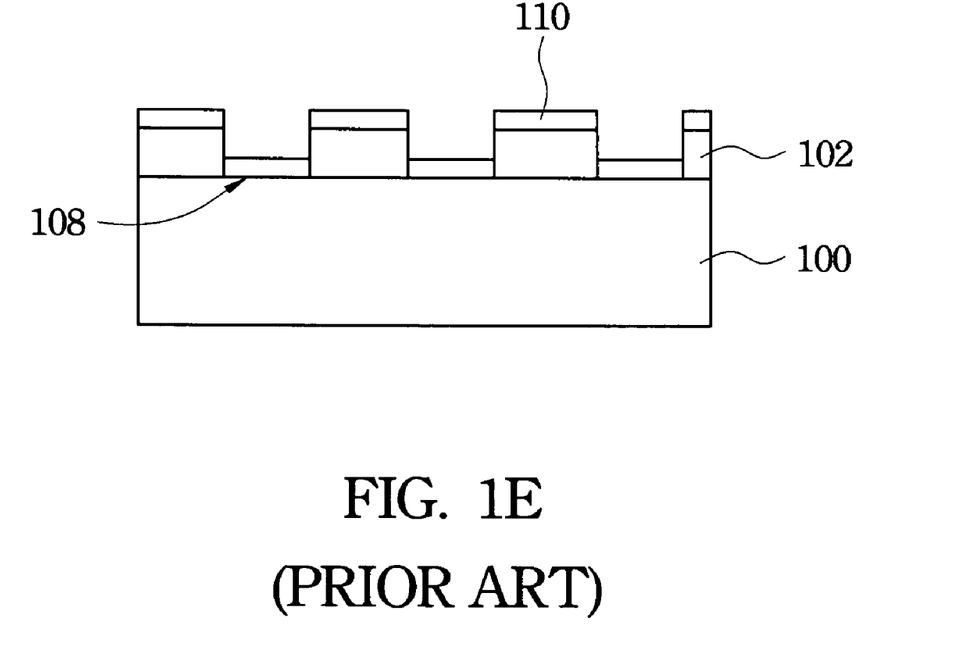

Next, the imprinting material layer 102 is etched to remove a portion of the imprinting material layer 102 until a portion of the surface 108 of the substrate 100 is exposed, such as shown in FIG. 1D. When the exposed surface 108 of the substrate 100 is etched by using the imprinting material layer 102 remained on the surface 108 of the substrate 100 as an etching mask, a portion of the imprinting material layer 102 is easily removed to damage the transferring pattern. As a result, a distortion phenomenon occurs when the pattern is transferred onto the substrate 100. Therefore, a mask layer 110 is additionally formed on the imprinting material layer 102 and the exposed surface 108 of the substrate 100, such as shown in FIG. 1E.

Figure 1F:
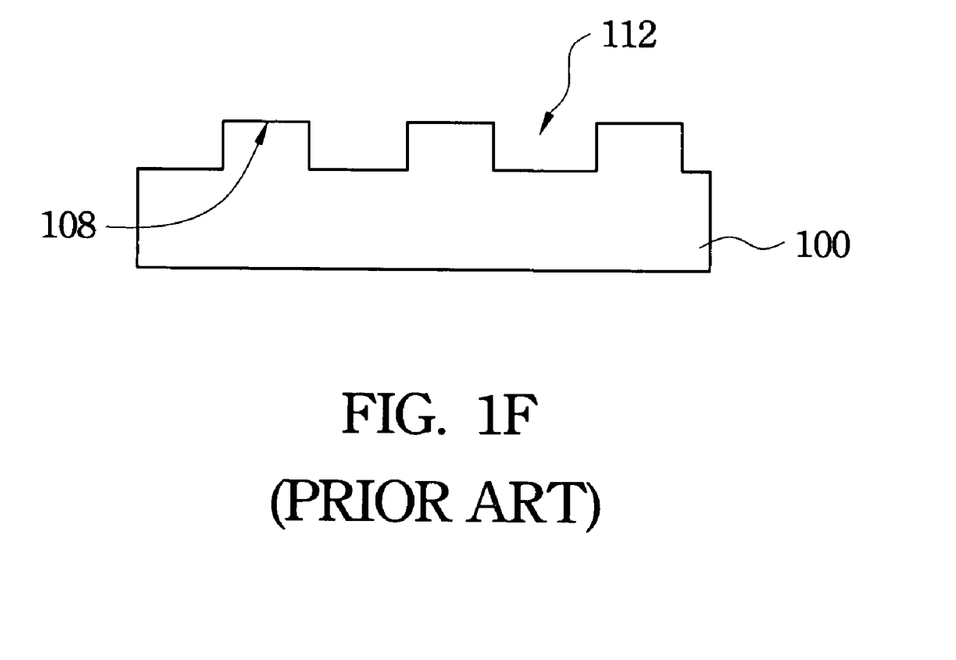

After the formation of the mask layer 110 is completed, the imprinting material layer 102 and the mask layer 110 on the imprinting material layer 102 are removed by a lift-off process to expose the underlying surface 108 of the substrate 100. Then, the exposed surface 108 of the substrate 100 may be etched by using the remaining mask layer 110 as the etching mask to remove a portion of the substrate 100, so as to form a pattern structure 112 on the surface 108 of the substrate 100 to further transfer the pattern of the imprinting material layer 102 onto the surface 108 of the substrate 100. Subsequently, as shown in FIG. 1F, the remaining mask layer 110 and the imprinting material layer 102 are removed to complete the imprinting process.

In the conventional imprinting process, the imprinting material layer 102 has to be etched until a portion of the surface 108 of the substrate 100 is exposed, and then the mask layer 110 as the etching mask is set on the exposed surface 108 of the substrate 100. However, the step of setting the mask layer 110 is very complicated, and the procedures of firstly etching the imprinting material layer 102 and then setting the mask layer 110 increase the complexity of the process.

SUMMARY OF THE INVENTION

One aspect of the present invention is to provide a nano-imprinting process, which can simplify the complicated steps required in typical nano-imprinting processes, so that the degradation of the accuracy caused by multiple processes can be reduced to rapidly and accurately define feature patterns to an imprinting material layer on a surface of a substrate desired to be imprinted, and to greatly reduce the contamination resulted from the processes.

Another aspect of the present invention is to provide a nano-imprinting process, in which the formation of an etching/exposure mask required in the definition of feature patterns on an imprinting material layer and a subsequent dry etching or exposure process can be completed by directly embedding the exposure/etching mask into the imprinting material layer, so that the time and the fabrication cost of the nano-imprinting process can be greatly reduced, to achieve low-cost, rapid and large-area imprinting. Therefore, the nano-imprinting process has great ability of mass production.

Still another aspect of the present invention is to provide a nano-imprinting process, which does not need an external heating source with high temperature during the imprinting process, so that the consumption of the energy can be saved to greatly reduce the production cost and to achieve an environment-friendly nano-imprinting process with low energy consumption.

Yet another aspect of the present invention is to provide a nano-imprinting process, which does not need an applied heating source with high temperature, so that electronic devices preset on a substrate will not be damaged by heat to enhance the process yield and the product reliability.

According to the aforementioned objectives, the present invention provides a nano-imprinting process, comprising: providing a substrate including an imprinting material layer covering a surface of the substrate; providing a mold including a plurality of protruding features and at least one indentation set on a surface of the mold, wherein the indentation is disposed between the protruding features, and the surface of the mold is covered with an anti-adhesion layer; forming a transferring material layer on a top surface of each protruding feature; pressing the surface of the mold into the imprinting material layer to make the transferring material layer embed in a first portion of the imprinting material layer; removing the mold and separating the mold and the transferring material layer simultaneously to transfer the transferring material layer into the first portion of the imprinting material layer and to expose a second portion of the imprinting material layer; using the transferring material layer as a mask to remove the second portion of the imprinting material layer and a portion of the substrate underlying the second portion of the imprinting material layer; and removing the first portion of the imprinting material layer and the transferring material layer.

According to a preferred embodiment of the present invention, the material of the substrate may be a silicon wafer, the material of the imprinting material layer may be PMMA, the material of the mold may be silicon, the material of the anti-adhesion layer may be 1H, 1H, 2H, 2H-perfluorooctyl-trichlorosilane, and the transferring material layer may be a chromium metal film.

BRIEF DESCRIPTION OF THE DRAWINGS

The foregoing aspects and many of the attendant advantages of this invention are more readily appreciated as the same become better understood by reference to the following detailed description, when taken in conjunction with the accompanying drawings, wherein.

DETAILED DESCRIPTION OF THE PREFERRED EMBODIMENT

The present invention discloses a nano-imprinting process, which can directly embed an etching mask into an imprinting material layer, so that the process can be effectively simplified to rapidly and accurately complete the nano-imprinting process. In order to make the illustration of the present invention more explicit, the following description is stated with reference to FIGS. 2A through 2F.

FIGS. 2A through 2F are schematic flow diagrams showing a nano-imprinting process in accordance with a preferred embodiment of the present invention. In an exemplary embodiment, a substrate 200 is provided, wherein the substrate 200 includes a surface 204 and a surface 206 on opposite sides. The material of the substrate 200 is, for example, a semiconductor material, a plastic material, a piezoelectric material, a dielectric material, a glass material, a ceramic material, an electrically conductive material, metal or any combinations of the aforementioned materials. In an embodiment, a silicon wafer may be adopted as the substrate 200. In a preferred embodiment, the substrate 200 can be further set with at least one pair of alignment marks to facilitate alignment in the following processes. The surface 204 of the substrate 200 is covered with an imprinting material layer 208, wherein the imprinting material layer 208 may be formed on the surface 204 of the substrate 200 by, for example a spin coating method, to make the imprinting material layer 208 uniformly distribute on the surface 204 of the substrate 200. The material of the imprinting material layer 208 may be a polymer-based material, such as a thermoplastic polymer material. The material of the imprinting material layer 208 may be composed of a photoresist material to facilitate the subsequent pattern definition. In an embodiment, the material of the imprinting material layer 208 may be PMMA, such as PMMA 950K (PMMA having a molecular weight of 950000) provided by MicroChem Co., Ltd.. In other embodiments, the material of the imprinting material layer 208 may be photoresist SAL-601 provided by Shipley Company, photoresist ZEP 520A provided by ZEON Co., Ltd., or photoresist NEB 31 provided by Sumitomo Chemical Co., Ltd.

Figure 2A:
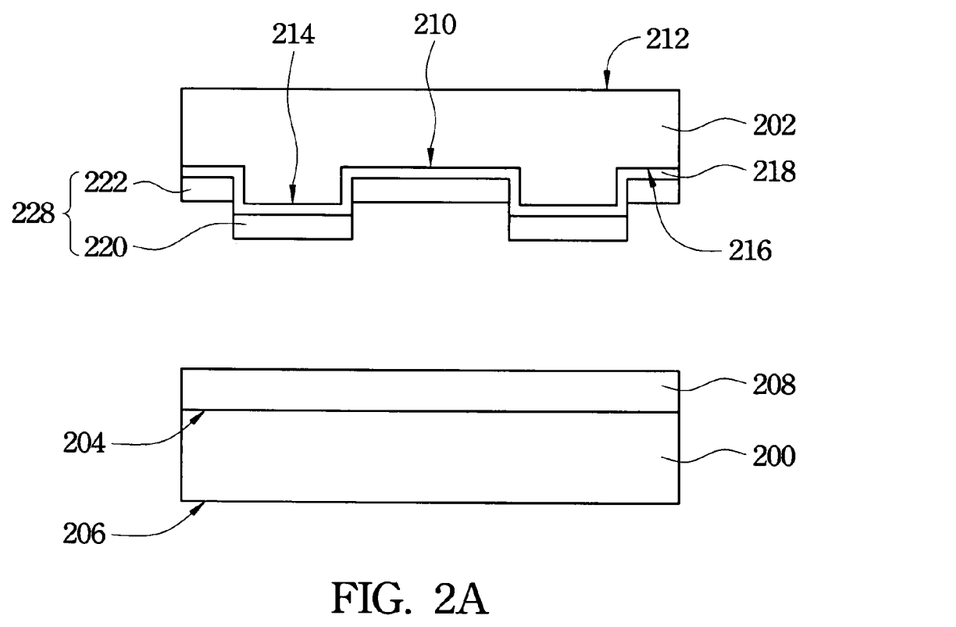
FIGS. 2A through 2F are schematic flow diagrams showing a nano-imprinting process in accordance with a preferred embodiment of the present invention.

When the substrate 200 is provided, a mold 202 for imprinting is provided, wherein the mold 202 includes surfaces 210 and 212 on opposite sides. The hardness of the mold 202 is larger than that of the imprinting material layer 208, wherein the material of the mold 202 is, for example, a semiconductor material, a plastic material, a piezoelectric material, a dielectric material, a glass material, a ceramic material, an electrically conductive material, metal or any combinations of the aforementioned materials. In an embodiment, a silicon wafer may be adopted as the mold 202. The surface 210 of the mold 202 is set with a pattern structure, wherein the pattern structure includes a plurality of protruding features 214 and at least one indentation 216, wherein the protruding features 214 protrude on the surface 210 of the mold 202, and the indentation 216 is disposed between the protruding features 214. In an exemplary embodiment, the size of the protruding features 214 may be on the micrometer scale or the nanometer scale. In a preferred embodiment, the mold 202 is also set with a pair of alignment marks corresponding to the alignment marks on the substrate 200 to facilitate alignment in the following processes. An anti-adhesion layer 218 is formed to cover the surface 210 of the mold 202 set with the protruding features 214 by, for example, an evaporation method, to ensure that a transferring material layer 228 can be successfully and completely transferred to the imprinting material layer 208 when the mold 202 contacts with the imprinting material layer 208 under the applying of an external pressure. The anti-adhesion layer 218 includes any materials that can make the transferring material layer 228 subsequently formed on the anti-adhesion layer 218 come off the surface 210 of the mold 202 and be transferred onto the surface of the imprinting material layer 208. In an exemplary embodiment, the material of the anti-adhesion layer 218 may be composed of 1H, 1H, 2H, 2H-perfluorooctyl-trichlorosilane while the material of the mold 202 is silicon.

Next, the transferring material layer 228 is formed on the surface 210 of the mold 202 by, for example, an evaporation method, such as an electron beam evaporation method. In an exemplary embodiment, because the transferring material layer 228 is formed by the evaporation process, the transferring material layer 228 is composed of two separated transferring material portions 220 and 222, wherein the transferring material portions 220 are deposited on a top surface of each protruding feature 214, and the transferring material portion 222 is deposited on a bottom surface of the indentation 216, such as shown in FIG. 2A. In another exemplary embodiment, the transferring material layer 228 is only deposited on the top surface of each protruding feature 214, i.e. the transferring material layer 228 only consists of the transferring material portions 220 on the top surfaces of the protruding features 214, by further using other definition technique, such as a photolithography and etching technique or a lift-off technique. The transferring material layer 228 is used as a mask structure in the subsequent process steps of exposing or etching the imprinting material layer 208 and etching the substrate 200, so that the transferring material layer 228 is preferably composed of a material that cannot be exposed to an exposure light of the imprinting material layer 208, or a material that has larger etching selectivity with the imprinting material layer 208 and the substrate 200. The material of the transferring material layer 228 is, for example, a semiconductor material, a plastic material, a piezoelectric material, an oxide material, a dielectric material, a glass material, a ceramic material, an electrically conductive material, metal or any combinations of the aforementioned materials. In an embodiment, the transferring material layer 228 may be a metal film, preferably a chromium metal film. In addition, in an exemplary embodiment, a ration of the thickness of the imprinting material layer 208 to that of the transferring material layer 228 is controlled in a value less than 100, preferably in a value less than 10. When the mold 202 and substrate 200 are disposed, the surface 210 of the mold 202 including the protruding features 214 set thereon is opposite to the surface 204 of the substrate 200 including the imprinting material layer 208 formed thereon, such as shown in FIG. 2A.

Figure 2B:
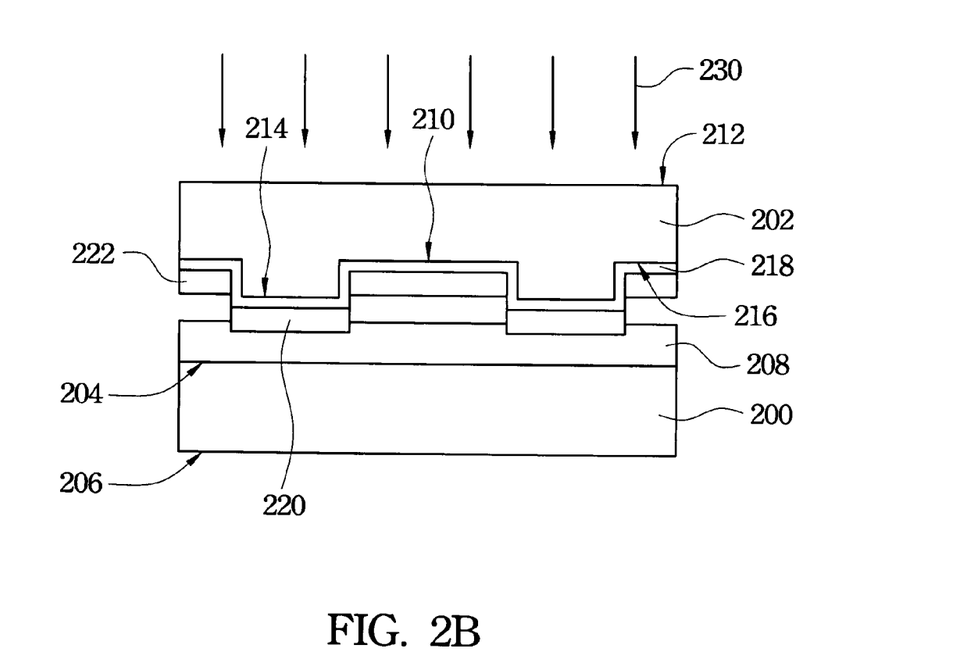

Then, a pressing step is performed on the mold 202 and the substrate 200. In an embodiment, a pressure 230 may be applied in the pressing step to directly press the surface 210 of the mold 202 against the surface 204 of the substrate 200 to make the transferring material portion 220 on the top surface of each protruding feature 214 completely or partly be pressed into a portion of the imprinting material layer 208 on the substrate 200, so as to make the transferring material portion 220 on the top surface of each protruding feature 214 completely or partly be embedded into some regions of the imprinting material layer 208. For example, as shown in FIG. 2B, the transferring material portions 220 on the top surfaces of the protruding features 214 are embedded in the some regions of the imprinting material layer 208 locally. However, in some embodiments, in the pressing step, the mold 202 is disposed on the substrate 200, wherein the surface 210 of the mold 202 is opposite to the surface 204 of the substrate 200, and the protruding features 214 on the surface 210 of the mold 202 closely adhere to the imprinting material layer 208 on the surface 204 of the substrate 200; and then the pressure 230 is applied to press the transferring material portions 220 on the top surfaces of the protruding features 214 of the mold 202 into a portion of the imprinting material layer 208 on the surface 204 of the substrate 200. In the illustrated embodiment shown in FIG. 2B, the pressure 230 is applied on the mold 202 from the surface 212 of the mold 202 to the surface 210. However, in other embodiments, in the pressing step, the pressure may be applied on the substrate 200 from the surface 206 of the substrate 200 to the surface 204; or, the pressures may be simultaneously applied on the surface 206 of the substrate 200 and the surface 212 of the mold 202 to make the surface 204 of the substrate 200 be oppositely connected to the surface 210 of the mold 202, so as to make the pressure distribution between the mold 202 and the imprinting material layer 208 on the substrate 200 more uniform. In the pressing step to connect the substrate 200 and the mold 202, the alignment marks on the substrate 200 and the mold 202 may be used to determine the relative location between the substrate 200 and the mold 202 during pressing.

Figure 2C:
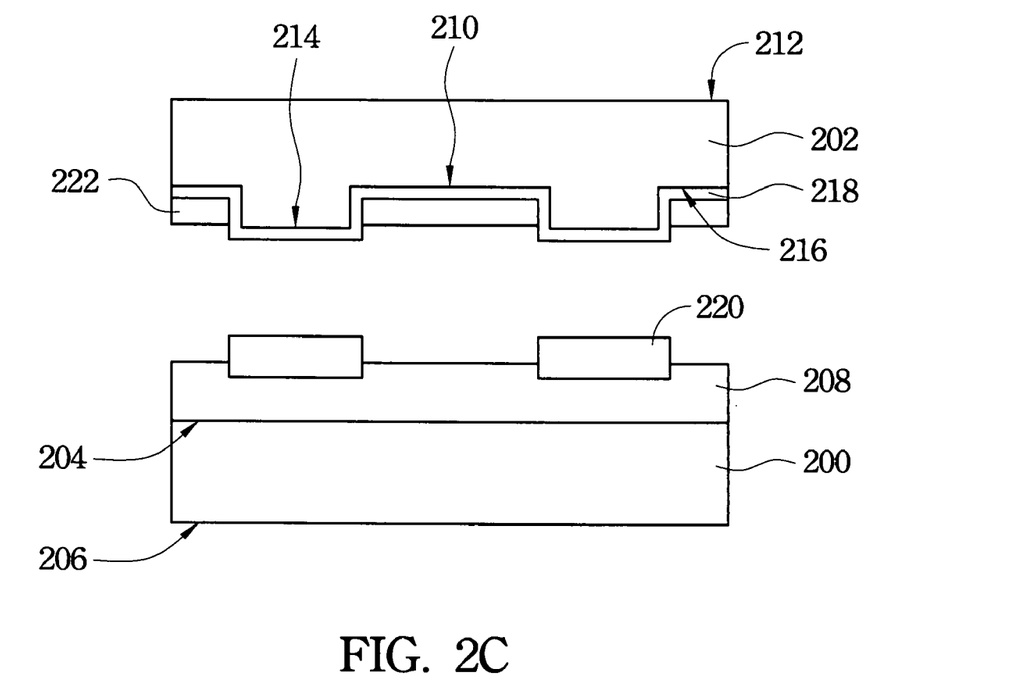

In the step of pressing and connecting the mold 202 and the substrate 200, a baking treatment is selectively applied on the imprinting material layer 208 by heating the substrate 200. In the baking treatment, a low-temperature heating method, such as a heating method with a heating temperature lower than about 120° C., is preferably adopted. Through the baking treatment, the diluted solvent within the imprinting material layer 208, which is in a liquid state at room temperature, can be evaporated or volatilized, to increase the solidification rate of the imprinting material layer 208 so as to rapidly increase the viscosity of the imprinting material layer 208. As a result, the adhesion force between the transferring material portions 220 pressed in the imprinting material layer 208 and the imprinting material layer 208 is larger than the adhesion force between the transferring material layer 228 and the anti-adhesion layer 218. Accordingly, as shown in FIG. 2C, in a mold-releasing step following the pressing step, when the mold 202 is removed, the transferring material portions 220 can successfully be separated from the anti-adhesion layer 218 on the mold 202 to embed into a portion of the imprinting material layer 208, so as to be completely transferred into the imprinting material layer 208. At present, the transferring material portions 220 have been successfully embedded into the imprinting material layer 208 and can be used as a photomask for the subsequent exposure and development step or as an etching mask for the subsequent etching step. The baking treatment of the imprinting material layer 208 may be performed by using an electrical resistance heating source, an eddy current heating source, an electromagnetic heating source or an optical heating source. After the mold 202 is removed, a portion of the imprinting material layer 208 that is not embedded by the transferring material portions 220 is exposed.

Figure 2D:
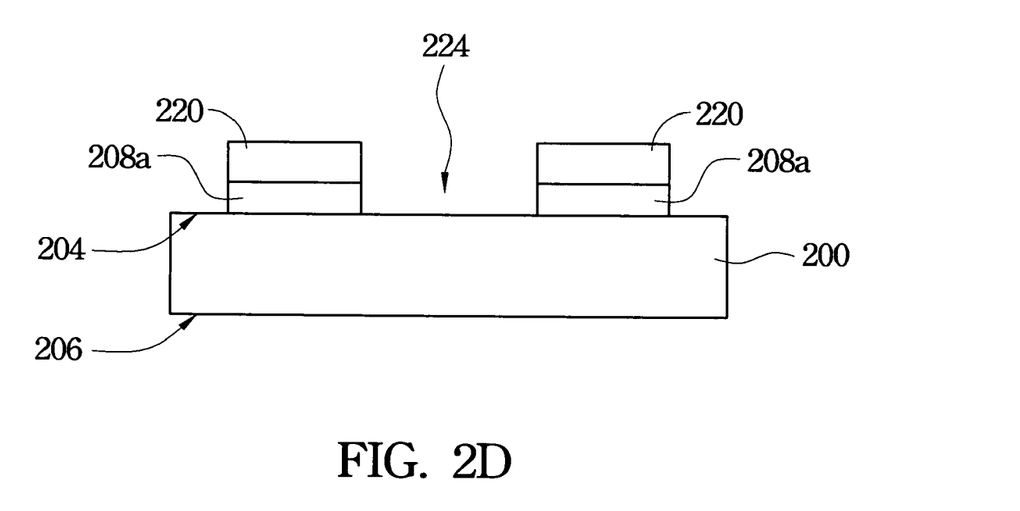

Next, the exposed portion of the imprinting material layer 208 is removed by an exposure and development method, or an etching method. In an exemplary embodiment, an exposure light source is used to expose the exposed portion of the imprinting material layer 208 composed of, for example, positive photoresist by using the transferring material portions 220 as the photomask, and then the exposed portion of the imprinting material layer 208 is removed by developing to expose a surface portion 224 of the underlying substrate 200 and to form an imprinting material layer 208a under the transferring material portions 220, such as shown in FIG. 2D. The exposure light source is, for example, deep UV light, UV light, a laser, a x-ray, an electron beam or an ion beam. The wavelength of the exposure light source is preferably between 0.05 Å to 100 µm. The laser among the exposure light sources may be an excimer laser, and the wavelength of the excimer laser is, for example, KrF-248 nm, ArF-193 nm, XeCl-308 nm or XeF-351 nm. In an embodiment, if the material of the imprinting material layer 208 is PMMA 950K A6, a suitable exposure light source may be deep UV light or electron beam. In another embodiment, if an electron beam is adopted as the exposure light source, the material of the imprinting material layer 208 may be PMMA, photoresist SAL-601, photoresist ZEP 520A or photoresist NEB 31.

In another exemplary embodiment, the exposed portion of the imprinting material layer 208 is removed by etching, so that two etching steps are used in the exemplary embodiment to respectively remove the exposed portion of the imprinting material layer 208 and the portion of the substrate 200 underlying the exposed portion of the imprinting material layer 208. The exposed portion of the imprinting material layer 208 is etched by using the transferring material portions 220 as the etching mask, to remove a portion of the imprinting material layer 208 until the underlying surface portion 224 of the substrate 200 is exposed and to form the imprinting material layer 208a under the transferring material portions 220, such as shown in FIG. 2D. In the etching of the exposed portion of the imprinting material layer 208, a dry etch method, such as a reactive ion etching (RIE) method or a deep reactive ion etching (DRIE) method, may be used, and $O_2$ plasma is used as the etchant for etching, for example.

Figure 2E:
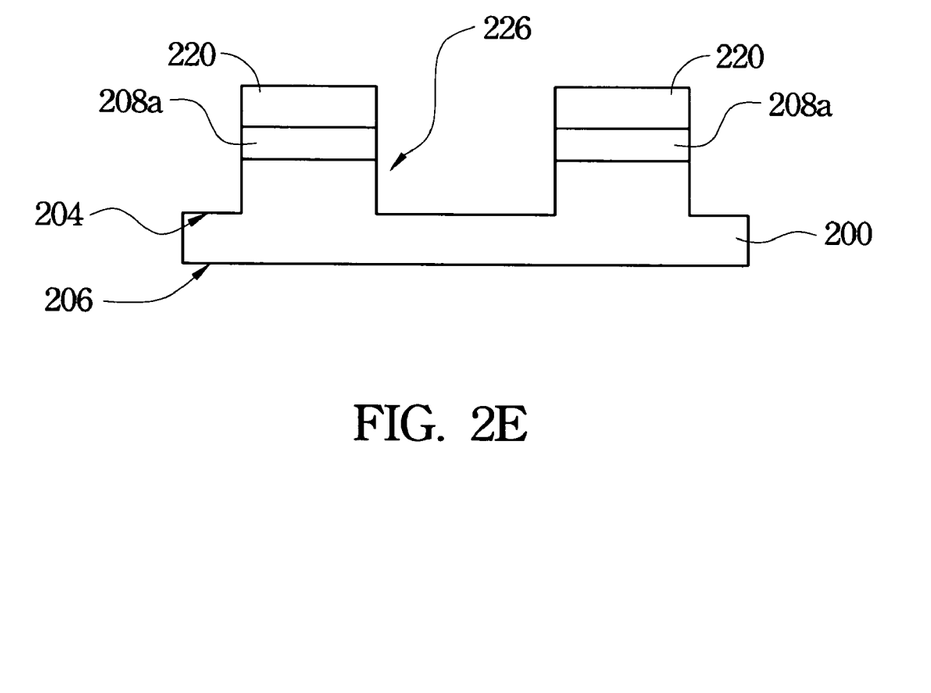

After the exposed portion of the imprinting material layer is removed by an exposure and development process or an etching method, the exposed surface portion 224 of the substrate 200 is etched by using the transferring material portions 220 and the underlying imprinting material layer 208a as the etching mask structure, to remove a portion of the substrate 200, so as to form a pattern structure 226 on the surface 204 of the substrate 200 to successfully transfer the pattern of the pattern structure of the mold 202 to the surface 204 of the substrate 200, such as shown in FIG. 2E. In the etching of the portion of the substrate 200, a dry etching method, such as a reactive ion etching method or a deep reactive ion etching method, may be used, and $SF_6$ plasma is used as the etchant for etching, for example.

Figure 2F:
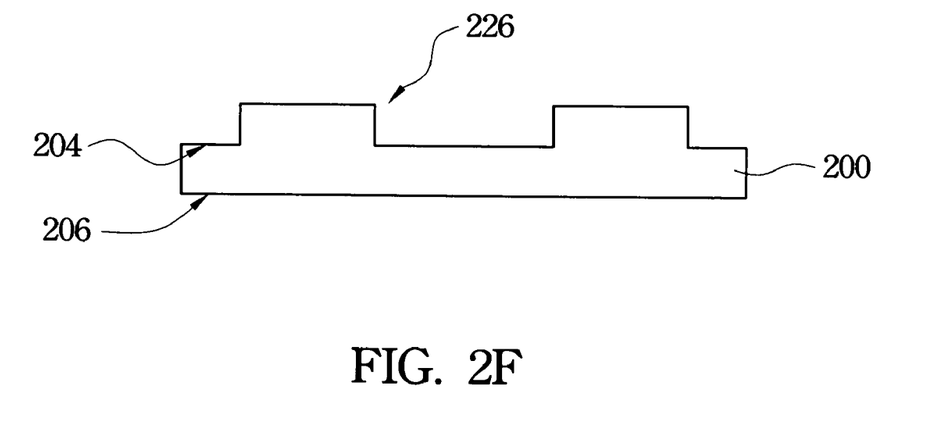

Subsequently, as shown in FIG. 2F, the remaining imprinting material layer 208a and the overlying transferring material portions 220 are removed by, for example, a lift-off method, to expose the other portion of the surface 204 of the substrate 200, so as to complete the nano-imprinting process of the surface 204 of the substrate 200.

In an exemplary embodiment, the imprinting process can be repeatedly performed on the same imprinting substrate, such as different regions of a wafer, until the imprinting procedures of the desired regions of the entire substrate are completed; or the imprinting process can be repeatedly performed on different layers on the same region of the same imprinting substrate so as to form a structure including multiple imprinting layers. In addition, the imprinting process can be performed in an automatic imprinting stage to further speed up the imprinting process.

According to the aforementioned embodiments, the nano-imprinting process of one exemplary embodiment of the present invention can simplify the complicated steps required in typical nano-imprinting processes, so that the degradation of the accuracy caused by multiple processes can be reduced to rapidly and accurately define feature patterns to an imprinting material layer on a surface of a substrate desired to be imprinted, and to further lighten the burden on the environment caused by the processes.

According to the aforementioned embodiments, the nano-imprinting process of one exemplary embodiment of the present invention can complete the formation of an etching/exposure mask required in the definition of feature patterns on an imprinting material layer and a subsequent dry etching or exposure process by directly embedding the photo/etching mask into the imprinting material layer, so that the time and the fabrication cost of the nano-imprinting process can be greatly reduced, to achieve low-cost, rapid and large-area imprinting. Therefore, the nano-imprinting process of one exemplary embodiment has great ability of mass production.

According to the aforementioned embodiments, the nano-imprinting process of one exemplary embodiment of the present invention does not need an external heating source with high temperature during the imprinting process, so that the consumption of the energy can be saved to greatly reduce the production cost and to achieve an environment-friendly nano-imprinting process with low energy consumption.

According to the aforementioned embodiments, the nano-imprinting process of one exemplary embodiment of the present invention does not need an applied heating source with high temperature, so that electronic devices preset on a substrate will not be damaged by heat to enhance the process yield and the product reliability.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A nano-imprinting process, comprising:
providing a substrate including an imprinting material layer covering a surface of the substrate;
providing a mold including a plurality of protruding features and at least one indentation set on a surface of the mold, wherein the indentation is disposed between the protruding features, and the surface of the mold is covered with an anti-adhesion layer;
forming a transferring material layer on a top surface of each protruding feature;
pressing the surface of the mold into the imprinting material layer to make the transferring material layer embed in a first portion of the imprinting material layer and not contact the substrate;
removing the mold and separating the mold and the transferring material layer simultaneously to transfer the transferring material layer into the first portion of the imprinting material layer and to reveal a second portion of the imprinting material layer;
using the transferring material layer as a mask to remove the second portion of the imprinting material layer and a portion of the substrate underlying the second portion of the imprinting material layer; and
removing the first portion of the imprinting material layer and the transferring material layer.

2. The nano-imprinting process according to claim 1, wherein
a material of the substrate is a semiconductor material, a plastic material, a piezoelectric material, a dielectric material, a glass material, a ceramic material, an electrically conductive material, metal, or any combinations thereof;
a material of the mold is a semiconductor material, a plastic material, a piezoelectric material, a dielectric material, a glass material, a ceramic material, an electrically conductive material, metal, or any combinations thereof; and
a material of the transferring material layer is a semiconductor material, a plastic material, a piezoelectric material, an oxide material, a dielectric material, a glass material, a ceramic material, an electrically conductive material, metal, or any combinations thereof.

3. The nano-imprinting process according to claim 1, wherein a material of the imprinting material layer is a polymer-based material or a photoresist material.

4. The nano-imprinting process according to claim 1, wherein
a material of the substrate is silicon;
a material of the imprinting material layer is PMMA;
a material of the mold is silicon;
a material of the anti-adhesion layer is 1H, 1H, 2H, 2H-perfluorooctyl-trichlorosilane; and the transferring material layer is a chromium metal film.

5. The nano-imprinting process according to claim 1, wherein a ration of a thickness of the imprinting material layer to a thickness of the transferring material layer is in a value less than 100.

6. The nano-imprinting process according to claim 1, wherein the step of forming the transferring material layer is performed by an electron beam evaporation method.

7. The nano-imprinting process according to claim 1, wherein the step of removing the second portion of the imprinting material layer and the portion of the substrate comprises:
performing a first removal step to remove the second portion of the imprinting material layer until a portion of the surface of the substrate is revealed; and
performing a second removal step on the portion of the surface of the substrate to remove the portion of the substrate.

8. The nano-imprinting process according to claim 7, wherein the first removal step is performed by a dry etching method.

9. The nano-imprinting process according to claim 7, wherein the first removal step is performed by an exposure and development method, and a wavelength of an exposure light source adopted in the first removal step is between 0.05 Å to 100 μm.

10. The nano-imprinting process according to claim 7, wherein the second removal step is performed by a dry etching method.

11. A nano-imprinting process, comprising:
providing a mold including a first surface and a second surface on opposite sides, wherein a plurality of protruding features and at least one indentation are set on the first surface of the mold, and the indentation is disposed between the protruding features;
forming an anti-adhesion layer to cover the first surface of the mold;
forming a transferring material layer including a first portion and a second portion, wherein the first portion of the transferring material layer is deposited on a top surface of each protruding feature, and the second portion of the transferring material layer is deposited on a bottom surface of the indentation;
providing a substrate including a first surface and a second surface on opposite sides;
forming an imprinting material layer to cover the first surface of the substrate;
performing a pressing step to embed the first portion of the transferring material layer into a first portion of the imprinting material layer and not contact the substrate;
removing the mold and separating the mold and the first portion of the transferring material layer simultaneously to transfer the first portion of the transferring material layer into the first portion of the imprinting material layer and to reveal a second portion of the imprinting material layer;
using the first portion of the transferring material layer as an etching mask/photomask to remove the second portion of the imprinting material layer and a portion of the substrate underlying the second portion of the imprinting material layer; and
removing the first portion of the imprinting material layer and the first portion of the transferring material layer.

12. The nano-imprinting process according to claim 11, wherein
a material of the mold is a semiconductor material, a plastic material, a piezoelectric material, a dielectric material, a glass material, a ceramic material, an electrically conductive material, metal, or any combinations thereof;
a material of the transferring material layer is a semiconductor material, a plastic material, a piezoelectric material, an oxide material, a dielectric material, a glass material, a ceramic material, an electrically conductive material, metal, or any combinations thereof;
a material of the substrate is a semiconductor material, a plastic material, a piezoelectric material, a dielectric material, a glass material, a ceramic material, an electrically conductive material, metal, or any combinations thereof; and
a material of the imprinting material layer is a polymer-based material or photoresist.

13. The nano-imprinting process according to claim 11, wherein a ration of a thickness of the imprinting material layer to a thickness of the transferring material layer is in a value less than 100.

14. The nano-imprinting process according to claim 11, wherein the step of forming the transferring material layer is performed by an electron beam evaporation method.

15. The nano-imprinting process according to claim 11, wherein the step of removing the second portion of the imprinting material layer and the portion of the substrate comprises:
performing a first removal step to remove the second portion of the imprinting material layer until a portion of the surface of the substrate is revealed; and
performing a second removal step on the portion of the surface of the substrate to remove the portion of the substrate.

16. The nano-imprinting process according to claim 15, wherein the first removal step is performed by a dry etching method.

17. The nano-imprinting process according to claim 15, wherein a material of the imprinting material layer is a photoresist material, the first removal step is performed by an exposure and development method, and a wavelength of an exposure light source adopted in the first removal step is between 0.05 Å to 100 μm.

18. The nano-imprinting process according to claim 15, wherein the second removal step is performed by a dry etching method.

* * * * *